United States Patent
Han et al.

(10) Patent No.: US 12,487,033 B2
(45) Date of Patent: Dec. 2, 2025

(54) SINUSOIDAL CORRUGATED TUBE-TYPE SPIRAL WOUNDED HEAT EXCHANGER SUITABLE FOR FLNG

(71) Applicant: CHINA UNIVERSITY OF PETROLEUM (EAST CHINA), Shandong (CN)

(72) Inventors: Hui Han, Qingdao (CN); Yuxing Li, Qingdao (CN); Jianlu Zhu, Qingdao (CN); Chongzheng Sun, Qingdao (CN); Cuiwei Liu, Qingdao (CN); Qihui Hu, Qingdao (CN); Wuchang Wang, Qingdao (CN); Xinran Yu, Qingdao (CN); Liang Liu, Qingdao (CN); Guocong Wang, Qingdao (CN); Hui Zhou, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 434 days.

(21) Appl. No.: 17/928,120

(22) PCT Filed: May 14, 2021

(86) PCT No.: PCT/CN2021/093916
§ 371 (c)(1),
(2) Date: Nov. 28, 2022

(87) PCT Pub. No.: WO2021/238684
PCT Pub. Date: Dec. 2, 2021

(65) Prior Publication Data
US 2023/0204296 A1 Jun. 29, 2023

(30) Foreign Application Priority Data
May 27, 2020 (CN) .......................... 202010461777.3

(51) Int. Cl.
*F28D 7/02* (2006.01)
*F25J 5/00* (2006.01)
(Continued)

(52) U.S. Cl.
CPC .............. *F28D 7/022* (2013.01); *F25J 5/002* (2013.01); *F28F 9/00* (2013.01); *F28F 25/02* (2013.01)

(58) Field of Classification Search
CPC ......... F28D 7/022; F28D 7/0083; F25J 5/002; F25J 2290/72; F28F 9/00; F28F 25/02; F28F 1/08; F28F 9/013; F28F 1/006
(Continued)

(56) References Cited

U.S. PATENT DOCUMENTS 5,638,898 A * 6/1997 Gu ............................ F28F 1/08
165/DIG. 532
6,997,445 B2 * 2/2006 Vedrine .................. B01D 3/008
261/109
(Continued)

FOREIGN PATENT DOCUMENTS

CN 2314327 Y 4/1999
CN 202171405 U 3/2012
(Continued)

OTHER PUBLICATIONS

CN106931306A Machine Translation (Year: 2017).*
(Continued)

*Primary Examiner* — Eric S Ruppert
*Assistant Examiner* — Gustavo A Hincapie Serna
(74) *Attorney, Agent, or Firm* — Oliff PLC

(57) ABSTRACT

A sinusoidal corrugated tube-type spiral wounded heat exchanger suitable for FLNG, wherein a top of an outer cylinder has a shell-side refrigerant inlet and a bottom thereof has a shell-side refrigerant outlet; a sinusoidal cor-
(Continued)

rugated tube-type liquid distributor is below the shell-side refrigerant inlet, a first sinusoidal corrugated winding tube bundle and a second sinusoidal corrugated winding tube bundle, which are heat exchanger tubes with a sinusoidal wave shape, are inside the outer cylinder, and peaks and troughs of the first sinusoidal corrugated winding tube bundle and the second sinusoidal corrugated winding tube bundle are in staggered correspondence one by one from top to bottom; a sinusoidal corrugated tube-type liquid distributor includes a one-into-two-type tube, a two-into-four-type tube, two sinusoidal corrugated tube-type liquid distribution tubes from top to bottom.

18 Claims, 2 Drawing Sheets

(51) Int. Cl.
  *F28F 9/00* (2006.01)
  *F28F 25/02* (2006.01)
(58) Field of Classification Search
  USPC .......................................................... 165/156
  See application file for complete search history.

(56) References Cited

U.S. PATENT DOCUMENTS

| | | | | |
|---|---|---|---|---|
| 7,205,533 | B2* | 4/2007 | Hingst | F25B 9/02 |
| | | | | 257/E23.099 |
| 8,534,090 | B2* | 9/2013 | Sowder | F25D 3/14 |
| | | | | 62/387 |
| 9,766,024 | B2 | 9/2017 | Ferstl et al. | |
| 10,113,802 | B2 | 10/2018 | Steinbauer et al. | |
| 2004/0234918 | A1* | 11/2004 | Velke | F24H 1/43 |
| | | | | 432/94 |
| 2007/0169924 | A1* | 7/2007 | Bussonnet | F28D 9/0006 |
| | | | | 165/157 |
| 2008/0115918 | A1* | 5/2008 | Kerber | F28F 9/026 |
| | | | | 165/165 |
| 2009/0301130 | A1* | 12/2009 | Schonberger | F25J 5/007 |
| | | | | 62/614 |
| 2010/0044011 | A1* | 2/2010 | Schleiter | F28D 7/024 |
| | | | | 165/104.19 |
| 2012/0240618 | A1* | 9/2012 | Vink | F25J 1/0241 |
| | | | | 165/200 |
| 2012/0261103 | A1* | 10/2012 | Steinbauer | F28D 7/024 |
| | | | | 165/163 |
| 2014/0090404 | A1* | 4/2014 | Simmonds | C01B 23/0036 |
| | | | | 62/6 |
| 2014/0216701 | A1* | 8/2014 | Vogerl | F28D 15/00 |
| | | | | 165/168 |
| 2014/0262162 | A1* | 9/2014 | Zimmer | F28F 27/02 |
| | | | | 165/157 |
| 2015/0000873 | A1 | 1/2015 | Steinbauer et al. | |
| 2015/0285561 | A1* | 10/2015 | Steinbauer | B23P 15/26 |
| | | | | 165/156 |
| 2015/0369548 | A1 | 12/2015 | Fersti et al. | |
| 2016/0102922 | A1* | 4/2016 | Bourne | F28F 21/062 |
| | | | | 165/156 |
| 2016/0209118 | A1* | 7/2016 | Roberts | F28F 9/026 |
| 2016/0216051 | A1* | 7/2016 | Kurukchi | F28F 25/08 |
| 2020/0318912 | A1* | 10/2020 | Bauer | F28F 25/02 |
| 2020/0355397 | A1* | 11/2020 | Alessandrini | F28F 1/025 |
| 2021/0156624 | A1* | 5/2021 | de Bock | F28F 13/08 |
| 2021/0199390 | A1* | 7/2021 | Helppolainen | F28D 7/022 |
| 2021/0270534 | A1* | 9/2021 | Erno | F28D 7/005 |
| 2021/0348850 | A1* | 11/2021 | Roberts | F28F 9/0275 |
| 2022/0055004 | A1* | 2/2022 | Lu | F28F 9/24 |
| 2022/0290894 | A1* | 9/2022 | Yin | F28D 1/0472 |

FOREIGN PATENT DOCUMENTS

| | | | | |
|---|---|---|---|---|
| CN | 102512913 A | | 6/2012 | |
| CN | 203281052 U | | 11/2013 | |
| CN | 104251630 A | | 12/2014 | |
| CN | 104884893 A | | 9/2015 | |
| CN | 105674771 A | * | 6/2016 | |
| CN | 106931306 A | * | 7/2017 | ............ F28D 7/08 |
| CN | 105823348 B | * | 11/2018 | ............ F28D 7/00 |
| CN | 108759506 A | * | 11/2018 | ............ F28C 1/14 |
| CN | 108981422 A | * | 12/2018 | ......... F28D 7/0066 |
| CN | 109029020 A | * | 12/2018 | ............ F28D 7/02 |
| CN | 109458760 A | | 3/2019 | |
| CN | 109990504 A | * | 7/2019 | ............ F28F 13/10 |
| CN | 111595180 A | | 8/2020 | |
| FR | 3038038 B1 | | 7/2017 | |
| WO | WO-2013158916 A1 | * | 10/2013 | ............ F02M 26/32 |
| WO | 2017/167458 A1 | | 10/2017 | |

OTHER PUBLICATIONS

Aug. 12, 2021 International Search Report issued in International Patent Application No. PCT/CN2021/093916.
Aug. 12, 2021 Written Opinion issued in International Patent Application No. PCT/CN2021/093916.

* cited by examiner

_US 12,487,033 B2_

SINUSOIDAL CORRUGATED TUBE-TYPE SPIRAL WOUNDED HEAT EXCHANGER SUITABLE FOR FLNG

CROSS-REFERENCES TO RELATED APPLICATIONS

This application claims priority benefits to Chinese Patent Application No. 202010461777.3, filed 27 May 2020, the contents of which are incorporated herein by reference.

TECHNICAL FIELD

The present invention relates to the technology field of enhanced heat transfer of the heat exchanger, and in particular to an optimization of a structure of a spiral wounded heat exchanger applied to a floating liquefied natural gas system (FLNG).

BACKGROUND

Information of the related art part is merely disclosed to increase the understanding of the overall background of the present invention, but is not necessarily regarded as acknowledging or suggesting, in any form, that the information constitutes the prior art known to a person of ordinary skill in the art.

FLNG is a new type of floating production system for offshore natural gas field development, with functions such as extraction, pre-treatment and liquefaction of natural gas. At the same time, the FLNG breaks the economic and costly limitations of long-distance pipelines and onshore production systems and is suitable for the development of small and medium-sized gas fields in deep sea. Currently, there are as many as 21 FLNG systems in the stages such as design, construction and commissioning in the world. When the spiral wounded heat exchanger is applied in offshore FLNGs, due to the influence of severe offshore conditions, the spiral wounded heat exchanger will suffer from the phenomenon such as an uneven liquid distribution of the liquid distributor and a partial flow of the shell-side fluid, which will destroy the stability of the flowing liquid film of the falling film of the refrigerant outside the tube, reduce the effective heat transfer area of the winding tube, deteriorate the heat transfer performance of the spiral wounded heat exchanger, and then affect the overall performance index of the FLNG liquefaction process?

SUMMARY

For overcoming the problems mentioned above, it is an object of the present invention to provide a sinusoidal corrugated tube-type spiral wounded heat exchanger suitable for FLNG, optimizing the spiral wounded heat exchanger in three aspects, namely a structure of a liquid distributor, a tube type of the winding tube bundle and a longitudinal arrangement way, to improve an offshore adaptability of the FLNG. The present invention has the advantages of strong offshore adaptability, stable refrigerant flow, compact structure, small floor space and high heat transfer efficiency, etc.

To solve the above technical problems, the present invention adopts a technical solution as follows:

a sinusoidal corrugated tube-type spiral wounded heat exchanger suitable for FLNG, comprising: an outer cylinder, wherein an inlet for shell-side refrigerant being provided at a top of the outer cylinder and an outlet for shell-side refrigerant being provided at a bottom of the outer cylinder; a sinusoidal corrugated tube-type liquid distributor being provided below the inlet for shell-side refrigerant, and two sinusoidal corrugated winding tube bundles longitudinally arranged inside the outer cylinder being a first sinusoidal corrugated winding tube bundle and a second sinusoidal corrugated winding tube bundle respectively, wherein the two sinusoidal corrugated winding tube bundles being heat exchanger tubes with a sinusoidal wave shape, and peaks and troughs of the first sinusoidal corrugated winding tube bundle itself and peaks and troughs of the second sinusoidal corrugated winding tube bundle itself respectively are in staggered correspondence one by one from top to bottom.

The present invention solves the problem that the heat exchange performance of the spiral wounded heat exchanger in the floating production system is reduced due to the severe offshore environment. The heat exchanger of the present invention has a good offshore adaptability, and the heat exchange performance is less affected by the severe offshore conditions. The staggered arrangement is that the peaks and the troughs of the two sinusoidal corrugated tube bundles are staggered above and below each other.

The first sinusoidal corrugated winding tube bundle and the second sinusoidal corrugated winding tube bundle are arranged in a crossing manner, and the peaks of the first sinusoidal corrugated winding tube bundle and the troughs of the second sinusoidal corrugated winding tube bundle correspond to each other up and down, and the troughs of the first sinusoidal corrugated winding tube bundle and the peaks of the second sinusoidal corrugated winding tube bundle correspond to each other up and down.

As a further technical solution, a diameter of the peak of the sinusoidal corrugated winding tube bundle ranges from 8 mm to 14 mm, a diameter of the trough of the sinusoidal corrugated winding tube bundle ranges from 6 mm to 12 mm, the diameter difference between the peak and the trough ranges from 1.5 mm to 2.5 mm, and an axial distance between the adjacent peak and trough is 4-8 mm. The sinusoidal corrugated winding tube bundle has a good flowability within the above-mentioned range of the diameter difference between the peak and the trough.

One peak and one trough of the sinusoidal corrugated winding tube bundle are adjacent to each other at an axial distance of 4-8 mm, and the axial distance being in a direction of a vertical axis along the outer cylinder.

As a further technical solution, a top end and a bottom end of the first sinusoidal corrugated winding tube bundle are connected to a side wall of the outer cylinder respectively, wherein an opening at the top end is a tube-side refrigerant outlet and an opening at the bottom end is a tube-side refrigerant inlet.

As a further technical solution, a top end and a bottom end of the second sinusoidal corrugated winding tube bundle are connected to the side wall of the outer cylinder respectively, wherein an opening at the top end is a natural gas outlet and an opening at the bottom end is a natural gas inlet.

As a further technical solution, a central barrel is further provided inside the outer cylinder, the first sinusoidal corrugated winding tube bundle and the second sinusoidal corrugated winding tube bundle are wound together on an outer surface of the central barrel, and the central barrel supports the first sinusoidal corrugated winding tube bundle and the second sinusoidal corrugated winding tube bundle.

As a further technical solution, the sinusoidal corrugated tube-type liquid distributor comprises a one-into-two-type tube, a two-into-four-type tube, two sinusoidal corrugated tube-type liquid distribution tubes from top to bottom, wherein the one-into-two-type tube consists of a main tube and a branch tube connected vertically, wherein the main tube is communicated to the shell-side refrigerant inlet, the two-into-four-type tube consists of two offset tubes and four distribution branch tubes, wherein the two offset tubes are communicated to the two ends of the branch tube respectively, and each two the distribution branch tubes are communicated to two ends of one the offset tube respectively. The two sinusoidal corrugated tube-type liquid distribution tubes are circular in structure respectively, and two ends of each of the four distribution branch tubes are connected to the two sinusoidal corrugated tube-type liquid distribution tubes.

As a further technical solution, a side wall of the sinusoidal corrugated tube-type liquid distribution tube is a sinusoidal wave-type structure, and spray ports are provided at peaks of the bottom of the sinusoidal corrugated tube-type liquid distribution tube.

As a further technical solution, the two sinusoidal corrugated tube-type liquid distribution tubes are a first sinusoidal corrugated tube-type liquid distribution tube and a second sinusoidal corrugated tube-type liquid distribution tube respectively, a diameter of the first sinusoidal corrugated tube-type liquid distribution tube is smaller than a diameter of the second sinusoidal corrugated tube-type liquid distribution tube, and the first sinusoidal corrugated tube-type liquid distribution tube is located on an inner side of the second sinusoidal corrugated tube-type liquid distribution tube, the distribution branch tubes are located between the two sinusoidal corrugated tube-type liquid distribution tubes, of which two ends are communicated to the two sinusoidal corrugated tube-type liquid distribution tubes respectively.

As a further technical solution, the positions of each of peaks and troughs of the first sinusoidal corrugated winding tube bundle and the second sinusoidal corrugated winding tube bundle are in staggered correspondence one by one from top to bottom, the first sinusoidal corrugated tube-type liquid distribution tube and the positions of each of the peaks and troughs of the first sinusoidal corrugated winding tube bundle are in staggered correspondence one by one from top to bottom, and the second sinusoidal corrugated tube-type liquid distribution tube and the positions of each of the peaks and troughs of the second sinusoidal corrugated winding tube bundle are in staggered correspondence one by one from top to bottom.

An application of the above-mentioned sinusoidal corrugated tube-type spiral wounded heat exchanger in the FLNG.

Beneficial effects of the present invention are as follows:

1. According to the present invention, compared with the traditional spiral wounded heat exchanger, optimizing the spiral wounded heat exchanger in three aspects: the structure of the liquid distributor, the tube type of the winding tube bundle and the longitudinal arrangement way, which improves the liquid distribution capacity of the spiral wounded heat exchanger of the FLNG, the heat transfer performance of the tube-side natural gas and the tube-side refrigerant, and the stability of the flow pattern of the falling film flowing of the shell-side refrigerant under severe offshore conditions.

2. According to the present invention, adopting the sinusoidal corrugated winding tube bundle, compared with the spiral wounded heat exchanger using traditional round tubes, can improve the heat transfer capacity of tube-side natural gas and refrigerant of the spiral wounded heat exchanger by 10% to 120%. Under the same natural gas processing capacity, adopting the sinusoidal corrugated winding tube bundles can reduce the heat transfer area of the spiral wounded heat exchanger and make the heat exchanger more compact, thus saving the overall floor space of the FLNG liquefaction process.

3. According to the present invention, adopting the sinusoidal corrugated tube-type liquid distributor, can greatly improve the liquid distribution capacity of the liquid distributor of the spiral wounded heat exchanger in the FLNG under severe offshore conditions because of the easy liquid convergence at the peak of the bottom thereof, thus improving the stability of the shell-side refrigerant flow of the spiral wounded heat exchanger in the FLNG.

4. According to the present invention, adopting the sinusoidal corrugated winding tube bundle can greatly reduce the phenomenon of shell-side refrigerant deviation caused by sloshing in spiral wound tube heat exchanger due to the up-and-down form of the sinusoidal wave pattern (peak and trough), so as to effectively suppresses the effect of severe offshore conditions on the stability of the shell-side flow pattern of the spiral wound heat exchanger.

5. There are three flow patterns of falling film flow outside the tube of the shell-side refrigerant of the spiral wounded heat exchanger: fan-flow pattern, column-flow pattern and droplet-flow pattern. The cooling capacity of the refrigerant under the fan-flow pattern is excessive, while the cooling capacity of the refrigerant under the droplet-flow pattern is insufficient, and the cooling capacity of the refrigerant under the column-flow pattern is fully utilized. Under severe offshore conditions, the deviation of the shell-side refrigerant in the spiral wounded heat exchanger adopted the conventional round tube easily forms the fan-flow pattern region and the droplet-flow pattern region, which makes the shell-side refrigerant and the heat exchange area cannot be effectively utilized. According to the present invention, adopting the sinusoidal corrugated tube-type liquid distributor, the spray positions thereof are in staggered correspondence to the peak and trough positions of the winding tube bundles from top to bottom one by one. Since that falling film flowing liquid can converge and fall between the two liquid columns at the inlet and is easy to converge liquid at the peak at the bottom, the arrangement form that the peaks and the troughs of the winding tube alternately correspond to each other is beneficial to improving the flow stability of the shell-side medium of the spiral wounded heat exchanger under severe offshore conditions, and the column-flow pattern is easier to form, so the cooling capacity and the heat exchange area of the shell-side refrigerant of the spiral wounded heat exchanger in FLNG can be fully utilized, and further the offshore adaptability of the spiral wounded heat exchanger in FLNG is improved.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Wherein, 1—shell-side refrigerant inlet, 2—outer cylinder, 3—tube-side refrigerant outlet, 4—natural gas outlet, 5—first sinusoidal corrugated tube-type liquid distribution tube, 6—central barrel, 7—tube-side refrigerant inlet, 8—natural gas inlet, 9—shell-side refrigerant outlet, 10—sinusoidal corrugated winding tube bundle, 11—second sinusoidal corrugated tube-type liquid distribution tube, 12—one-into-two-type tube, 13—two-into-four-type tube, 14—liquid distribution communicating tube.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present disclosure. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

As described in the background, when being applied in offshore FLNGs, due to the influence of severe offshore conditions, the spiral wounded heat exchanger will suffer from the phenomenon such as an uneven liquid distribution of the liquid distributor and a partial flow of the shell-side fluid, which will destroy the uniform distribution of liquid film outside the tube, reduce the effective heat transfer area of the winding tube, deteriorate the heat transfer performance of the spiral wounded heat exchanger, and then affect the overall performance index of the FLNG liquefaction process. To solve the above technical problems, the present invention proposed a sinusoidal corrugated tube-type spiral wounded heat exchanger suitable for the FLNG.

Figure 1:
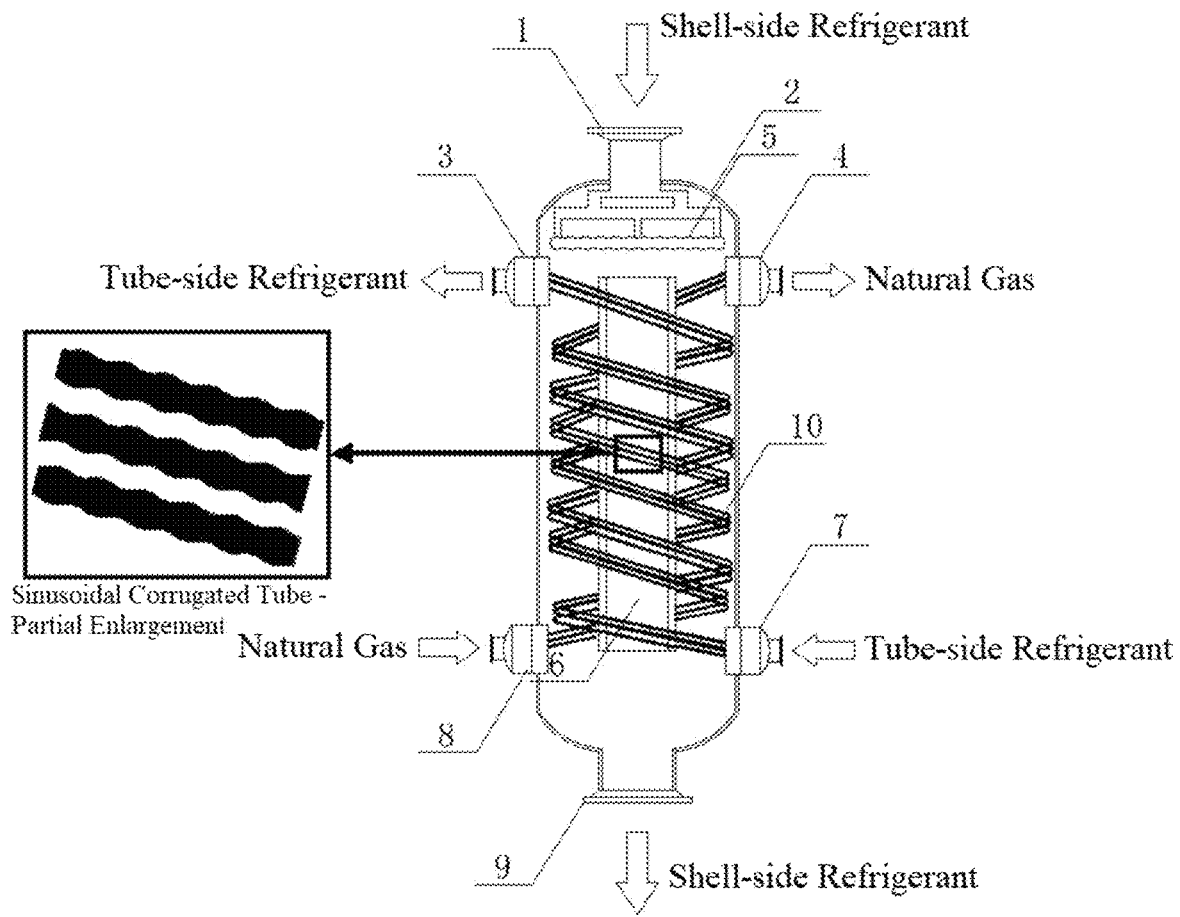
FIG. 1 is an overall structure diagram of a sinusoidal corrugated tube-type spiral wounded heat exchanger suitable for a FLNG.

As shown in FIG. 1, an inner part of an outer cylinder of a sinusoidal corrugated tube-type spiral wounded heat exchanger is provided with a first sinusoidal corrugated winding tube bundle and a second sinusoidal corrugated winding tube bundle, a top of the outer cylinder 2 is an inlet 1 for shell-side refrigerant and a bottom of the outer cylinder 2 is an outlet 9 for shell-side refrigerant, the sinusoidal corrugated winding tube bundles 10 are heat exchanger tubes in a shape of a sinusoidal wave, wherein, peaks and troughs of the first sinusoidal corrugated winding tube bundle and the second sinusoidal corrugated winding tube bundle are in staggered correspondence one by one from top to bottom, to facilitate the shell-side refrigerant to completely fall from the peaks at the bottom of the winding tube. The liquid is easy to gather at the peaks at the bottom of the winding tube bundle, and the staggered arrangement of the peaks and the troughs can improve the stability of a shell-side flow pattern of the spiral wounded heat exchanger under severe offshore conditions, and ensure that a shell-side cooling capacity and a heat exchange area of the spiral wounded heat exchanger in FLNG can be fully utilized.

The first sinusoidal corrugated winding tube bundle and the second sinusoidal corrugated winding tube bundle are arranged in a crossing manner, wherein the peaks of the first sinusoidal corrugated winding tube bundle and the troughs of the second sinusoidal corrugated winding tube bundle correspond to each other up and down, and the troughs of the first sinusoidal corrugated winding tube bundle and the peaks of the second sinusoidal corrugated winding tube bundle correspond to each other up and down.

According to the present invention, a diameter of the winding tube at the peak ranges from 8 mm to 14 mm, a diameter of the winding tube at the trough ranges from 6 mm to 12 mm. A recommended diameter difference between the peak and the trough ranges from 1.5 mm to 2.5 mm, and an axial distance between adjacent peak and trough is 4-8 mm.

A top end and a bottom end of the first sinusoidal corrugated winding tube bundle are connected to a side wall of the outer cylinder respectively, wherein an opening at the top end is an outlet 3 for the tube-side refrigerant and an opening at the bottom end is an inlet 7 for the tube-side refrigerant. A top end and a bottom end of the second sinusoidal corrugated winding tube bundle are connected to the side wall of the outer cylinder respectively, wherein an opening at the top end is an outlet 4 for the natural gas and an opening at the bottom end is an inlet 8 for the natural gas.

The sinusoidal corrugated winding tube bundles 10 are wound on the central barrel 6, the central barrel 6 plays a supporting role.

Figure 2:
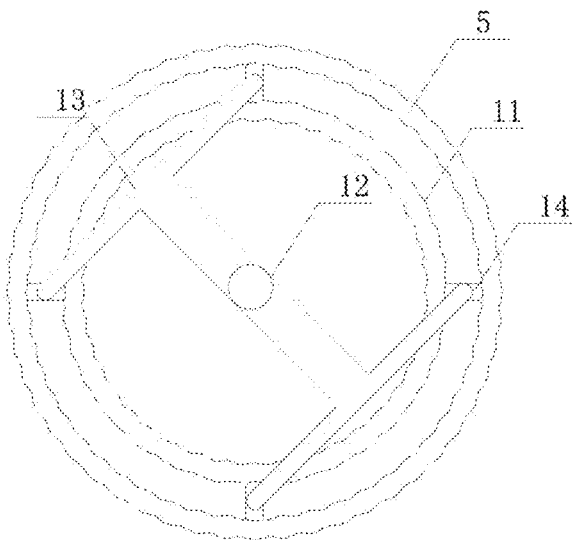
FIG. 2 is a top view of a sinusoidal corrugated tube-type liquid distributor.
Figure 3:
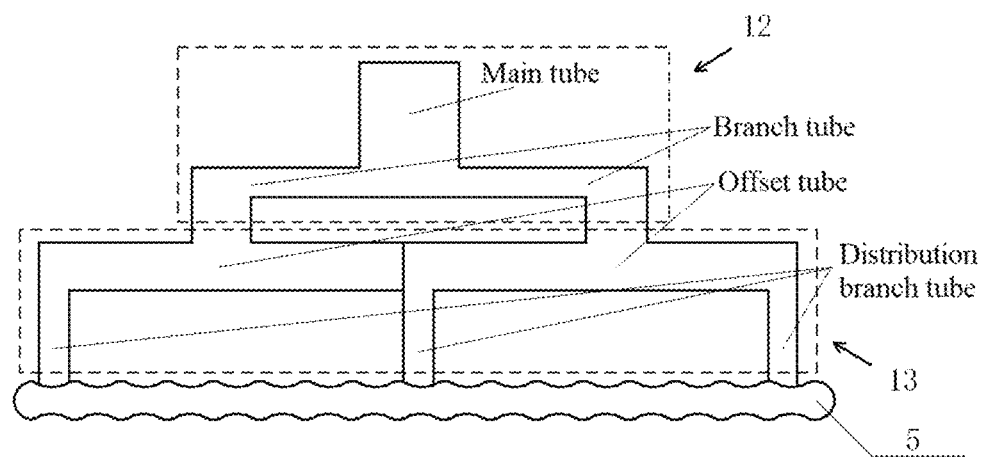
FIG. 3 is a side view of the sinusoidal corrugated tube-type liquid distributor.

As shown in FIGS. 2 and 3, the sinusoidal corrugated tube-type liquid distributor comprises a one-into-two-type tube 12, a two-into-four-type tube 13, and two sinusoidal corrugated tube-type liquid distribution tubes. Wherein, the one-into-two-type tube 12 consists of a main tube and a branch tube connected vertically, and the main pipe is communicated to the inlet 1 for shell-side refrigerant, the two-into-four-type tube 13 consists of two offset tubes and four distribution branch tubes, wherein the two offset tubes are communicated to the two ends of the branch tube respectively, and each two distribution branch tubes are communicated to the two ends of each the offset tubes respectively. The two sinusoidal corrugated tube-type liquid distribution tubes are circular in structure, and the two ends of each of the four distribution branch tubes are communicated to the two sinusoidal corrugated tube-type liquid distribution tubes.

After being distributed by the one-into-two-type tube 12 and the two-into-four-type tube 13, the shell-side refrigerant enters the first sinusoidal corrugated tube-type liquid distribution tube 5 and the second sinusoidal corrugated tube-type liquid distribution tube 11 respectively through the liquid distribution communicating tube 14. Then The shell-side refrigerant is sprayed from orifices provided on the peaks at the bottom of the first sinusoidal corrugated tube-type liquid distribution tube 5 and the second sinusoidal corrugated tube-type liquid distribution tube 11 to the sinusoidal corrugated winding tube bundles.

The first sinusoidal corrugated tube-type liquid distribution tube 5 corresponds to positions of the peaks and troughs of the first sinusoidal corrugated winding tube bundle, and the second sinusoidal corrugated tube-type liquid distribution tube 11 corresponds to positions of the peaks and troughs of the second sinusoidal corrugated winding tube bundle. The peaks and troughs of the second sinusoidal corrugated wingding tube bundle are located inside the peaks and troughs of the first sinusoidal corrugated winding tube bundle, i.e., the peaks and troughs of the first sinusoidal corrugated winding tube bundle are closer to the side wall of the outer cylinder. The spraying positions of the sinusoidal corrugated tube-type liquid distributors correspond to the positions of the peaks and troughs of the sinusoidal corrugated winding tube bundles, staggered one by one from top to bottom, which improves the stability of the flow pattern of the falling film flowing outside the tube of the spiral wounded heat exchanger under the severe offshore conditions.

During operation, the natural gas and the tube-side refrigerant enter the inside of the sinusoidal corrugated winding tube bundles and flow spirally from the bottom to the top to absorb the cooling capacity. The natural gas is liquefied inside the sinusoidal corrugated winding tube bundle, and the tube-side refrigerant flows out the spiral wounded heat exchanger, is throttled by the low-temperature throttle valve, and becomes the shell-side refrigerant after being cooled and depressurized.

The shell-side refrigerant, after being uniformly distributed by sinusoidal corrugated tube-type liquid distributor, flows out from the peak positions at the bottom of the liquid distributor. Since the peaks at the bottom of the sinusoidal corrugated tube-type liquid distributor are easy to gather the refrigerant, it greatly enhances the dispensing ability under severe offshore conditions compared with the traditional round tube-type liquid distributor. The shell-side refrigerant flows from top to bottom outside the sinusoidal corrugated winding tube bundles to release the cooling capacity.

The foregoing descriptions are merely preferred embodiments of the present invention but are not intended to limit the present invention. A person skilled in art may make various alterations and variations to the present invention. Any modification, equivalent replacement, improvement, etc. made within the spirit and principle of the present invention shall fall within the protection scope of the present invention.

What is claimed is:

1. A sinusoidal corrugated tube-type spiral wounded heat exchanger suitable for FLNG, comprising:
    an outer cylinder, wherein an inlet for shell-side refrigerant being provided at a top of the outer cylinder and an outlet for shell-side refrigerant being provided at a bottom of the outer cylinder;
    a sinusoidal corrugated tube-type liquid distributor being provided below the inlet for shell-side refrigerant, wherein;
    two sinusoidal corrugated winding tube bundles longitudinally arranged inside the outer cylinder are a first sinusoidal corrugated winding tube bundle and a second sinusoidal corrugated winding tube bundle respectively,
    the two sinusoidal corrugated winding tube bundles are heat exchanger tubes with a sinusoidal wave shape, and peaks and troughs of the first sinusoidal corrugated winding tube bundle itself and peaks and troughs of the second sinusoidal corrugated winding tube bundle itself respectively are in staggered correspondence one by one from the top to the bottom.

2. The sinusoidal corrugated tube-type spiral wounded heat exchanger suitable for FLNG according to claim 1, wherein: a diameter of the peak of the sinusoidal corrugated winding tube bundle ranges from 8 mm to 14 mm, a diameter of the trough of the sinusoidal corrugated winding tube bundle ranges from 6 mm to 12 mm, a diameter difference between the peak and the trough ranges from 1.5 mm to 2.5 mm, and an axial distance between the adjacent peak and trough is 4-8 mm.

3. The sinusoidal corrugated tube-type spiral wounded heat exchanger suitable for FLNG according to claim 1, wherein: a top end and a bottom end of the first sinusoidal corrugated winding tube bundle are connected to a side wall of the outer cylinder respectively, wherein an opening at the top end is an outlet for tube-side refrigerant and an opening at the bottom end is an inlet for tube-side refrigerant.

4. The sinusoidal corrugated tube-type spiral wounded heat exchanger suitable for FLNG according to claim 1, wherein: a top end and a bottom end of the second sinusoidal corrugated winding tube bundle are connected to the side wall of the outer cylinder respectively, wherein an opening at the top end is an outlet for natural gas and an opening at the bottom end is an inlet for natural gas.

5. The sinusoidal corrugated tube-type spiral wounded heat exchanger suitable for FLNG according to claim 1, wherein: a central barrel is further provided inside the outer cylinder, the first sinusoidal corrugated winding tube bundle and the second sinusoidal corrugated winding tube bundle are wound together on an outer surface of the central barrel, and the central barrel supports the first sinusoidal corrugated winding tube bundle and the second sinusoidal corrugated winding tube bundle.

6. The sinusoidal corrugated tube-type spiral wounded heat exchanger suitable for FLNG according to claim 1, wherein:
    the sinusoidal corrugated tube-type liquid distributor comprises a one-into-two-type tube, a two-into-four-type tube, two sinusoidal corrugated tube-type liquid distribution tubes from a top to a bottom of the sinusoidal corrugated tube-type liquid distributor,
    the one-into-two-type tube comprises a main tube and two branch tubes connected vertically,
    the main tube is communicated to the shell-side refrigerant inlet,
    the two-into-four-type tube comprises two offset tubes and four distribution branch tubes,
    the two offset tubes are communicated to the ends of the two branch tubes respectively, and each two of the four distribution branch tubes are communicated to ends of respective ones of the two offset tubes,
    the two sinusoidal corrugated tube-type liquid distribution tubes are circular in structure respectively, and
    ends of each of the four distribution branch tubes are connected to the two sinusoidal corrugated tube-type liquid distribution tubes.

7. The sinusoidal corrugated tube-type spiral wounded heat exchanger suitable for FLNG according to claim 6, wherein: a side wall of the two sinusoidal corrugated tube-type liquid distribution tube is a sinusoidal wave-type structure, and spray ports are provided at peaks of a bottom of the two sinusoidal corrugated tube-type liquid distribution tube.

8. The sinusoidal corrugated tube-type spiral wounded heat exchanger suitable for FLNG according to claim 6, wherein: the two sinusoidal corrugated tube-type liquid distribution tubes are a first sinusoidal corrugated tube-type liquid distribution tube and a second sinusoidal corrugated tube-type liquid distribution tube respectively, a diameter of the first sinusoidal corrugated tube-type liquid distribution tube is smaller than a diameter of the second sinusoidal corrugated tube-type liquid distribution tube, and the first sinusoidal corrugated tube-type liquid distribution tube is located on an outer side of the second sinusoidal corrugated tube-type liquid distribution tube, the distribution branch tubes are located between the two sinusoidal corrugated tube-type liquid distribution tubes, of which two ends are communicated to the two sinusoidal corrugated tube-type liquid distribution tubes respectively.

9. The sinusoidal corrugated tube-type spiral wounded heat exchanger suitable for FLNG according to claim 1, wherein: positions of each of peaks and troughs of the first sinusoidal corrugated winding tube bundle and the second sinusoidal corrugated winding tube bundle are in staggered correspondence one by one from top to bottom, the positions of the peaks and troughs of the first sinusoidal corrugated wingding tube bundle are located outside the positions of the peaks and troughs of the second sinusoidal corrugated winding tube bundle, the first sinusoidal corrugated tube-type liquid distribution tube and the positions of each of the peaks and troughs of the first sinusoidal corrugated winding tube bundle are in staggered correspondence one by one from top to bottom, and the second sinusoidal corrugated tube-type liquid distribution tube and the positions of each of the peaks and troughs of the second sinusoidal corrugated winding tube bundle are in staggered correspondence one by one from top to bottom.

10. A floating production system comprising the sinusoidal corrugated tube-type spiral wounded heat exchanger suitable for FLNG of claim 1.

11. A floating production system comprising the sinusoidal corrugated tube-type spiral wounded heat exchanger suitable for FLNG of claim 2.

12. A floating production system comprising the sinusoidal corrugated tube-type spiral wounded heat exchanger suitable for FLNG of claim 3.

13. A floating production system comprising the sinusoidal corrugated tube-type spiral wounded heat exchanger suitable for FLNG of claim 4.

14. A floating production system comprising the sinusoidal corrugated tube-type spiral wounded heat exchanger suitable for FLNG of claim 5.

15. A floating production system comprising the sinusoidal corrugated tube-type spiral wounded heat exchanger suitable for FLNG of claim 6.

16. A floating production system comprising the sinusoidal corrugated tube-type spiral wounded heat exchanger suitable for FLNG of claim 7.

17. A floating production system comprising the sinusoidal corrugated tube-type spiral wounded heat exchanger suitable for FLNG of claim 8.

18. A floating production system comprising the sinusoidal corrugated tube-type spiral wounded heat exchanger suitable for FLNG of claim 9.

* * * * *